United States Patent
Dixon et al.

(10) Patent No.: US 10,024,252 B2
(45) Date of Patent: Jul. 17, 2018

(54) METHODS AND SYSTEMS FOR AN EXHAUST GAS RECIRCULATION SYSTEM

(71) Applicant: Ford Global Technologies, LLC, Dearborn, MI (US)

(72) Inventors: Jon Dixon, Maldon (GB); Andres Arevalo, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 15/156,694

(22) Filed: May 17, 2016

(65) Prior Publication Data

US 2016/0348598 A1    Dec. 1, 2016

(30) Foreign Application Priority Data

Jun. 1, 2015   (GB) .................................. 1509379.2

(51) Int. Cl.
| | |
|---|---|
| *F02M 26/50* | (2016.01) |
| *F02D 41/00* | (2006.01) |
| *F02D 41/04* | (2006.01) |
| *F02M 26/73* | (2016.01) |

(52) U.S. Cl.
CPC ..... *F02D 41/0055* (2013.01); *F02D 41/0077* (2013.01); *F02D 41/042* (2013.01); *F02M 26/50* (2016.02); *F02M 26/73* (2016.02); *F02D 2041/0067* (2013.01); *Y02T 10/47* (2013.01)

(58) Field of Classification Search
CPC ....................................................... F02M 26/50
USPC .......................................... 123/568.16, 568.21
See application file for complete search history.

(56) References Cited

U.S. PATENT DOCUMENTS

| | | | |
|---|---|---|---|
| 5,410,993 A | 5/1995 | Masuda et al. | |
| 5,666,932 A | 9/1997 | Bauerle et al. | |
| 6,227,922 B1 | 5/2001 | Ochiai | |
| 7,832,373 B2 | 11/2010 | Enomoto | |
| 2009/0164106 A1* | 6/2009 | Enomoto | ............ F02D 41/0055 701/111 |
| 2012/0048216 A1* | 3/2012 | Tomazic | ............ F02M 25/0707 123/3 |
| 2014/0366853 A1 | 12/2014 | Ichihara | |

FOREIGN PATENT DOCUMENTS

| | | |
|---|---|---|
| DE | 102009045359 A1 | 4/2011 |
| FR | 2824380 A1 | 11/2002 |
| JP | 2007239680 A | 9/2007 |
| JP | 2008038636 A | 2/2008 |

OTHER PUBLICATIONS

Examination Report of Great Britain Patent Application No. 1509379.2, dated Nov. 2, 2015, 5 pages, United Kingdom Intellectual Property Office.

* cited by examiner

*Primary Examiner* — Erick Solis
(74) *Attorney, Agent, or Firm* — Julia Voutyras; McCoy Russell LLP

(57) ABSTRACT

Methods and systems are provided for an exhaust gas recirculation valve. In one example, a system may include a valve being cleaned following a delay subsequent an engine shut-down.

20 Claims, 9 Drawing Sheets

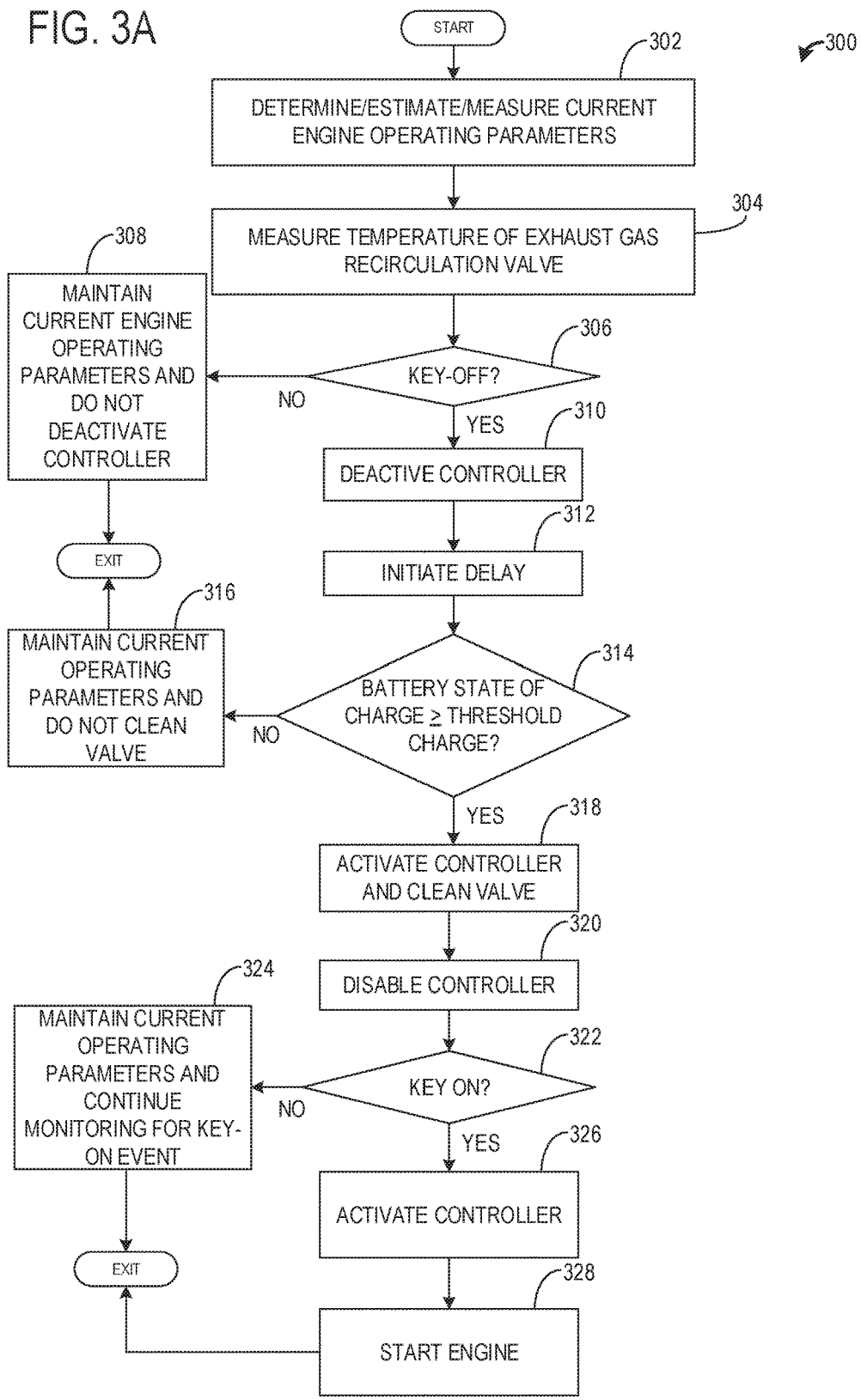

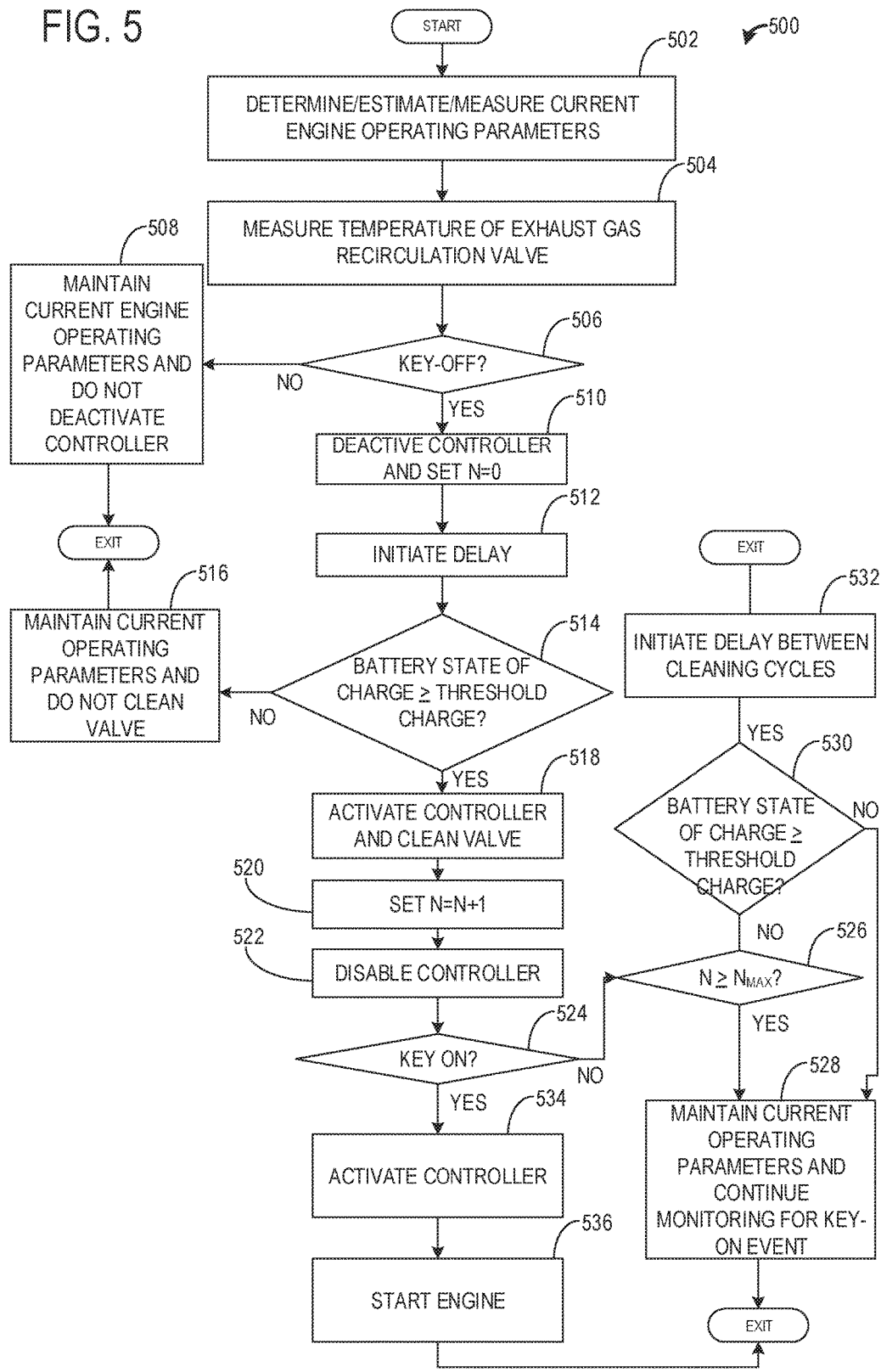

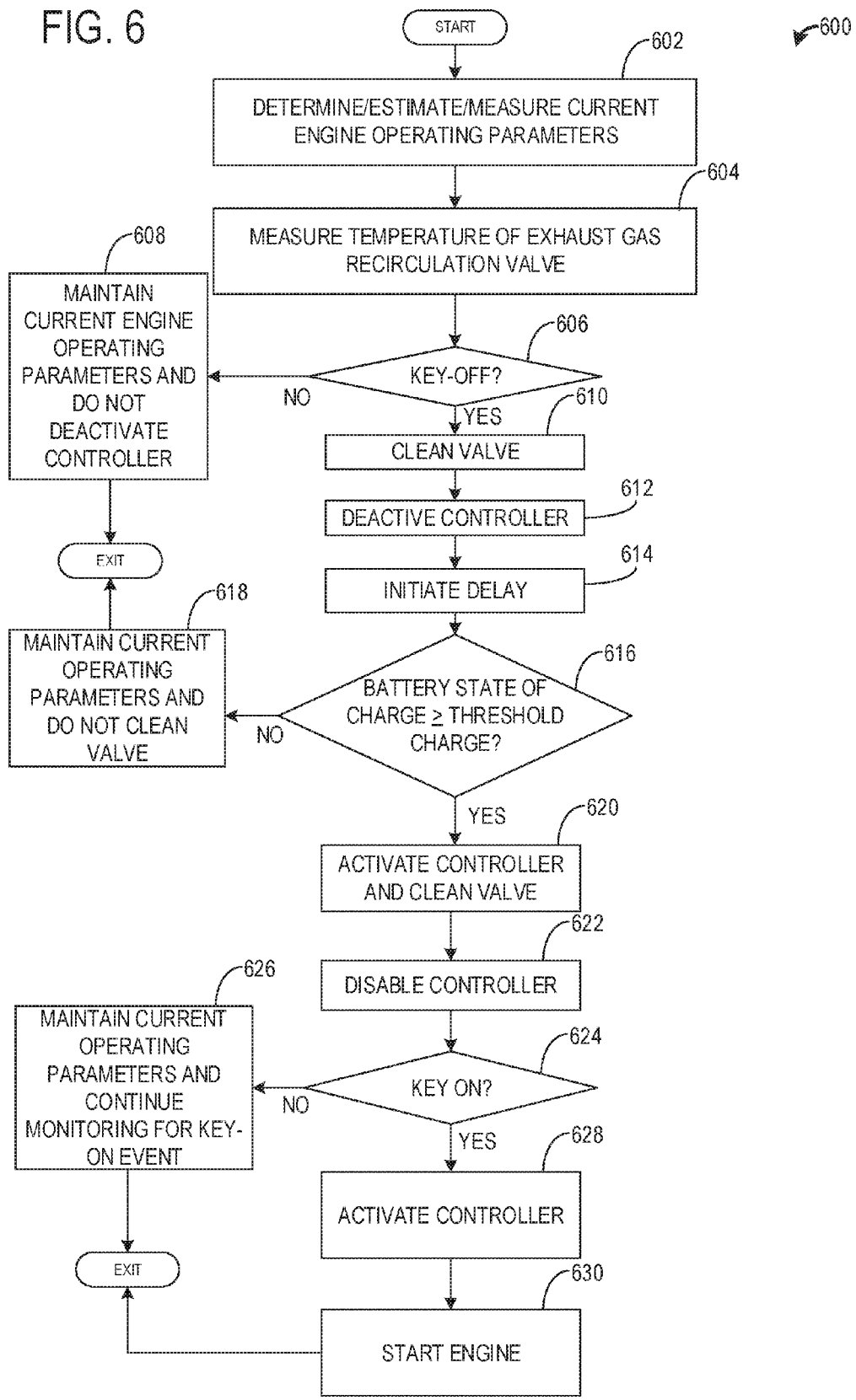

METHODS AND SYSTEMS FOR AN EXHAUST GAS RECIRCULATION SYSTEM

CROSS-REFERENCE TO RELATED APPLICATION

This application claims priority to Great Britain Patent Application No. 1509379.2, entitled "AN EXHAUST GAS RECIRCULATION SYSTEM," filed on Jun. 1, 2015, the entire contents of which are hereby incorporated by reference for all purposes.

FIELD

The present description relates generally to an exhaust gas recirculation system for an engine of a motor vehicle and in particular to an apparatus and method of reducing malfunctioning of an exhaust gas recirculation valve forming part of the system.

BACKGROUND/SUMMARY

Many vehicles utilize exhaust gas recirculation (EGR) to meet increasingly stringent emissions standards. By using EGR, an in-cylinder temperature may decrease, thereby reducing the formation of $NO_x$ and other pollutants. However, EGR is not treated and/or filtered before being diverted from the exhaust passage to an intake manifold. Thus, the EGR may still comprise liquid fuel and/or combustion by-products, which may degrade an EGR valve.

Such malfunctioning may be caused by a portion of the EGR valve being unable to open from its closed position due to accumulated deposits of combustion products on the valve. This type of malfunctioning normally occurs during a cold-start. If a control system used to control opening and closing of the EGR valve tries to open the EGR valve after the engine has been started from cold and the valve is stuck then it will not open or will open slowly and in either case an error code indicating the malfunction of the EGR valve will be generated.

The deposits are generally exhaust products, primarily soot and hydrocarbon, which condense and coalesce on a stem of the valve during engine cooling and then harden as they cool. When the valve is hot, these deposits are soft and the valve can be opened and closed normally. However, by the time that the valve has been heated sufficiently after an engine start to soften the deposits, an EGR valve malfunction will already have occurred, been detected and been indicated.

Attempts to address exhaust gas recirculation valve degradation include actuating the valve following an engine shut-off event. One example approach is shown by Enomoto in U.S. Pat. No. 7,832,373. Therein, the cleaning cycle typically involves sweeping the valve over its full range of movement a number of times.

However, the inventors herein have recognized potential issues with such systems. As one example, by cleaning the EGR valve directly after an engine shut-off, the dislodged particulates may still impinge onto surfaces of the valve due to a temperature of the valve being substantially similar to an operating temperature.

In one example, the issues described above may be addressed by an exhaust gas recirculation system for an engine of a motor vehicle comprising an exhaust gas recirculation passage connecting an exhaust gas outlet from the engine to an air inlet of the engine, an exhaust gas recirculation valve for controlling a flow of exhaust gas through the exhaust gas recirculation passage, and an electronic controller to control opening and closing of a valve of the exhaust gas recirculation valve during engine operation and to control the exhaust gas recirculation valve to perform at least one valve cleaning operation to remove deposits from the valve when the engine is deactivated, wherein the electronic controller is further operable to delay execution of the at least one valve cleaning operation following a shutdown of the engine to allow cooling of the valve to take place thereby reducing a likelihood that deposits will reform on the valve after the valve cleaning operation has taken place. In this way, an optimal cleaning temperature of the exhaust gas recirculation valve may be reached prior to performing the valve cleaning operation.

As one example, the electronic controller may be operable to enter a sleep mode during the delay between the shutdown of the engine and the start of the cleaning operation in order to reduce the consumption of electricity by the electronic controller. The electronic controller may have a timer to define the delay between the shutdown of the engine and the start of the cleaning operation. The length of the delay may be based upon a comparison of an output from the timer with a predefined time limit. The exhaust gas recirculation system may further comprise a temperature sensor arranged to provide a measurement of temperature to the electronic controller indicative of a temperature of the exhaust gas recirculation valve and the length of the delay between the shutdown of the engine and the start of the cleaning operation may be based upon a comparison of the measured temperature with a predefined temperature limit. The electronic controller may include a model of predicted relationship between temperature and time for the exhaust gas recirculation valve and the length of the delay between the shutdown of the engine and the start of the cleaning operation may be based upon a comparison of the predicted temperature with a predefined temperature limit. There may be two or more cleaning operations and the electronic controller may be operable to enter a sleep mode during a first delay between the shutdown of the engine and commencement of a first one of the cleaning operations and may be further operable to enter the sleep mode during respective delay periods between subsequent cleaning operations.

According to a second aspect of the present disclosure, there is provided a motor vehicle having an engine, at least one battery, a human machine interface to selectively start and shutdown the engine and an exhaust gas recirculation system constructed in accordance with said first aspect of the invention. The cleaning of the exhaust gas recirculation valve may only be permitted if a state of charge of the battery is above a predefined state of charge limit.

According to a third aspect of the present disclosure there is provided a method of cleaning an exhaust gas recirculation valve having a moveable valve, the method comprising delaying cleaning of the exhaust gas recirculation valve after shutdown of the engine to allow cooling of the valve to take place thereby reducing the likelihood that deposits will reform on the valve after the cleaning operation has been completed. The method may further comprise putting an electronic controller used to control operation of the exhaust gas recirculation valve into a sleep mode during the delay between the shutdown of the engine and the start of the cleaning operation in order to reduce the consumption of electricity by the electronic controller. The method may further comprise using a comparison of an output from a timer with a predefined time limit to determine the length of the delay. The length of the delay may be based upon a comparison of a measured temperature of the exhaust gas recirculation valve with a predefined temperature limit. The length of the delay may be based upon a comparison of a predicted temperature of the exhaust gas recirculation valve with a predefined temperature limit. The method may comprise using two or more cleaning operations to clean the exhaust gas recirculation valve and an electronic controller used to control the exhaust gas recirculation valve may be put in a sleep mode during the delay between the shutdown of the engine and the start of a first one of the cleaning operations and the electronic controller may also be put into the sleep mode during respective delay periods between subsequent cleaning operations.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a high level flow chart of a first embodiment of a method of cleaning an exhaust gas recirculation valve having a moveable valve so as to reduce exhaust gas recirculation valve malfunctioning in accordance with a third aspect of the invention.

FIG. 5 shows a high level flow chart of a third embodiment of a method of cleaning an exhaust gas recirculation valve having a moveable valve so as to reduce exhaust gas recirculation valve malfunctioning in accordance with the third aspect of the invention.

FIG. 6 shows a high level flow chart of a fourth embodiment of a method of cleaning an exhaust gas recirculation valve having a moveable valve so as to reduce exhaust gas recirculation valve malfunctioning in accordance with the third aspect of the invention.

DETAILED DESCRIPTION

Figure 1:
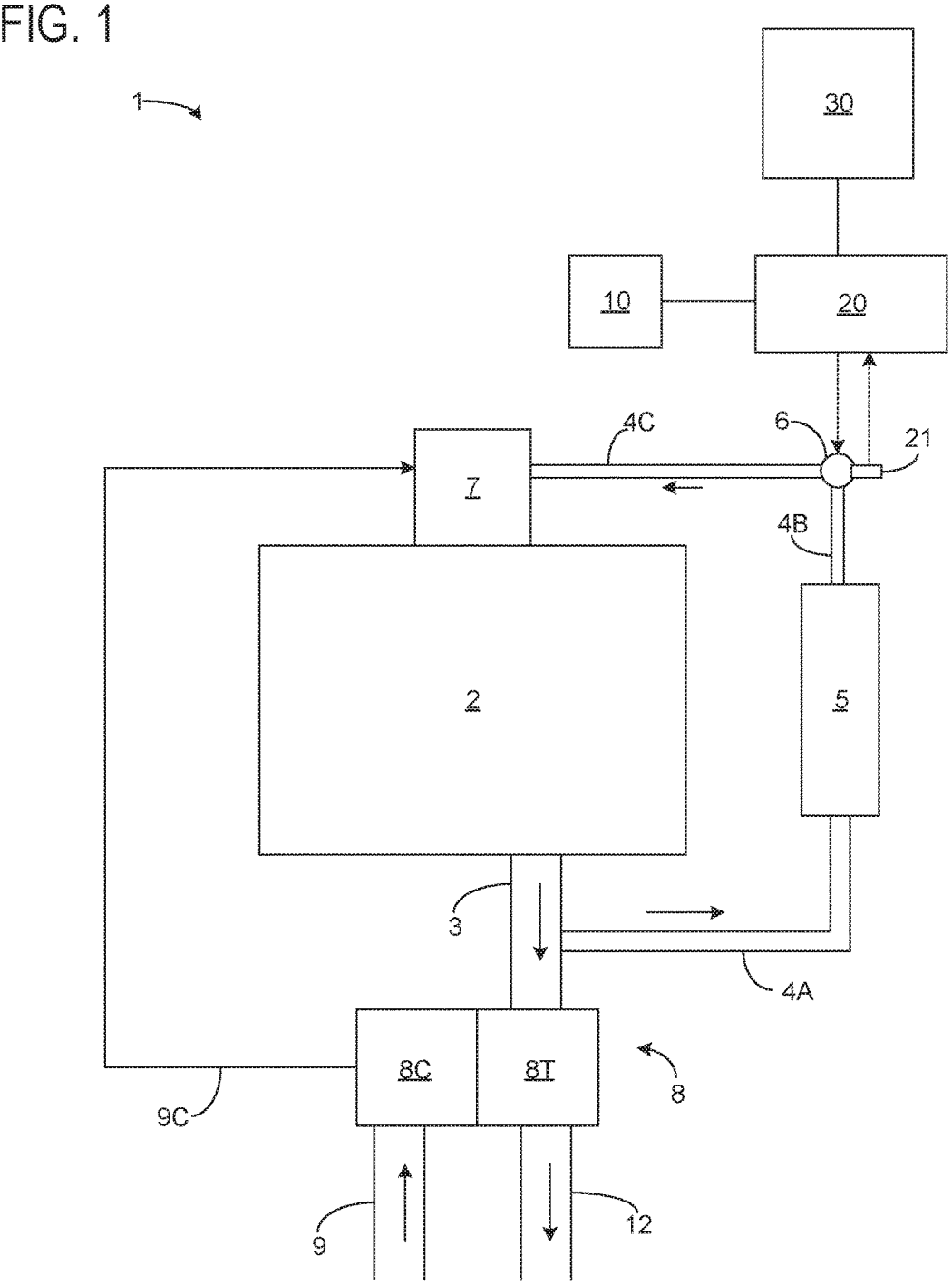
FIG. 1 shows a schematic diagram of a motor vehicle according to a second aspect of the present disclosure having an exhaust gas recirculation system according to a first aspect of the invention.
Figure 2A:
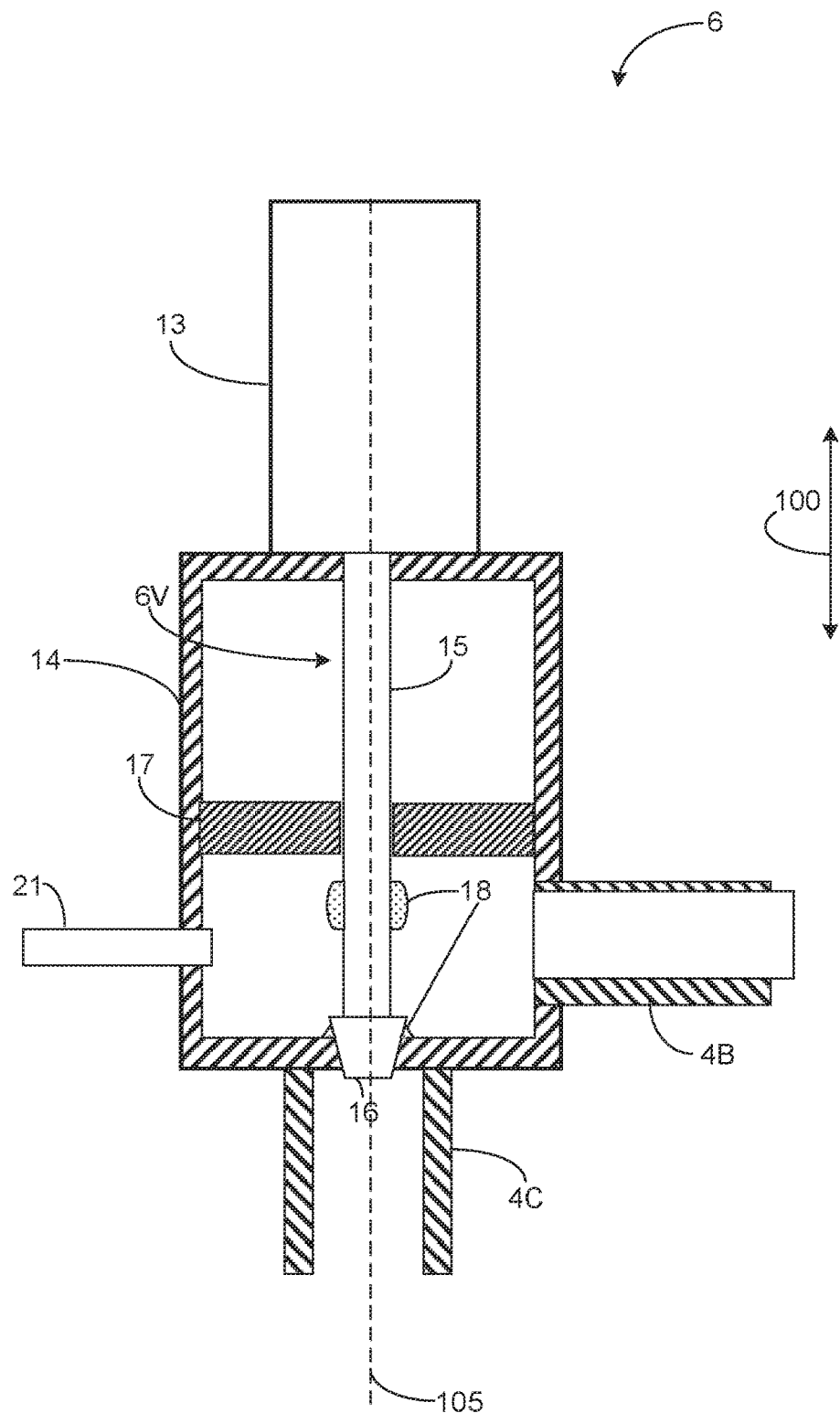
FIG. 2A shows a diagrammatic representation of an exhaust gas recirculation valve for use in the exhaust gas recirculation system shown in FIG. 1 showing a valve of the exhaust gas recirculation valve in a closed position.
Figure 2B:
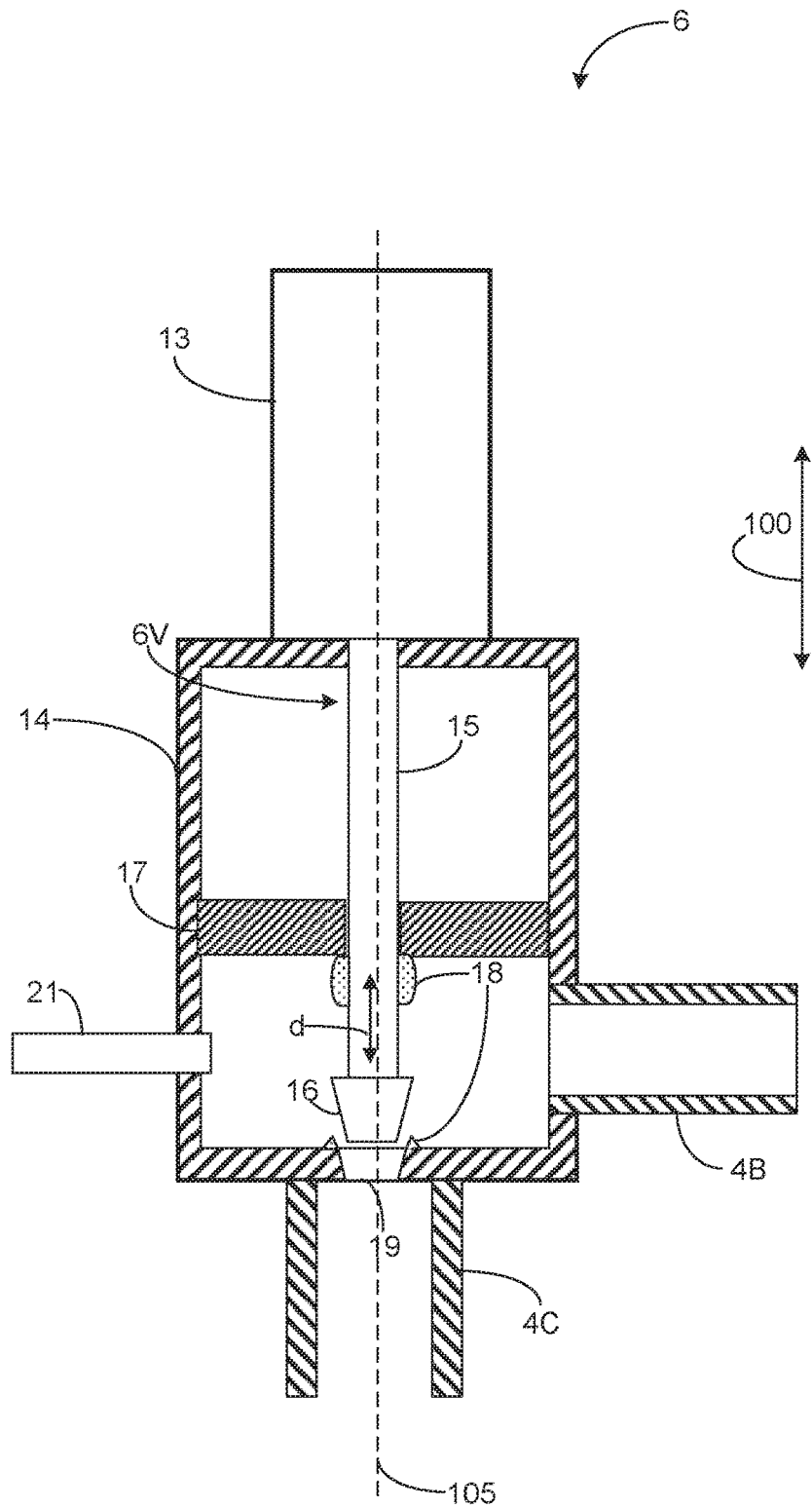
FIG. 2B shows a diagrammatic representation similar to that of FIG. 2A but showing the valve in a partially open position.
Figure 3B:
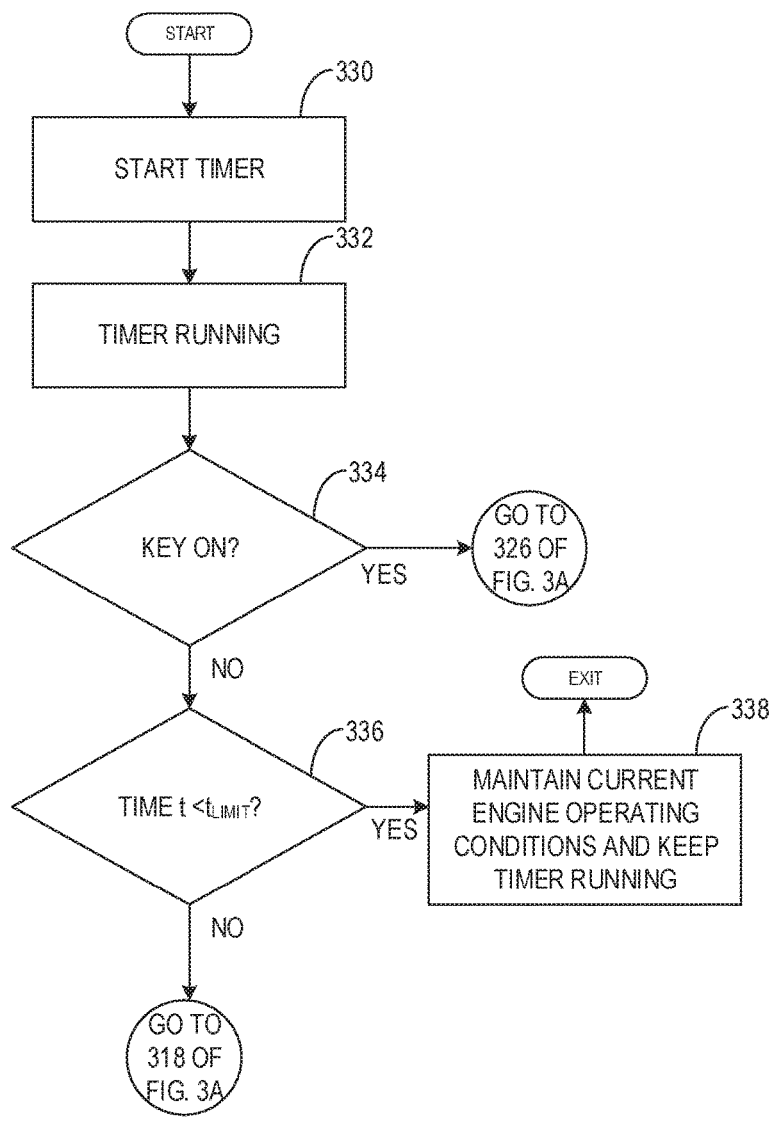
FIG. 3B shows a first routine for use in the method of FIG. 3A for delaying the starting of a valve member cleaning operation.

The following description relates to systems and methods for cleaning an exhaust gas recirculation valve. The exhaust gas recirculation valve may redirect untreated exhaust gas from an exhaust passage to an intake passage, as shown in FIG. 1. Particulates in the recirculated exhaust gas may impinge onto portions of the valve, where the particulates may cause one or more moveable portions of the valve to stick (e.g., not move from a closed position to an open position), as shown in FIG. 2A. The valve further comprises a guide, which may both direct a movement of a moveable portion while also serving to clean the moveable portion, as shown in FIG. 2B. A method for cleaning the valve following a key-off event is shown in FIG. 3A, while FIGS. 3B and 3C include further optional operations regarding when to initiate cleaning of the valve following the key-off event. A method for cleaning the exhaust gas recirculation valve based on a number of cleaning cycles is shown in FIG. 4. A method for accounting for a state of charge of a battery electrically powering the controller is shown in FIG. 5. A method, similar to the method in FIG. 3A, further includes performing a cleaning cycle directly after a key-off event is shown in FIG. 6.

Turning now to FIG. 1, it shows a motor vehicle 1 having an engine in the form of an engine 2 arranged to supply exhaust gas via an outlet passage 3 to a turbocharger 8. The turbocharger 8 has a turbine 8T driven by the exhaust gas from the engine 2 and a compressor 8C driven by the turbine 8T. Exhaust gas having passed through the turbine 8T exits the motor vehicle 1 via an exhaust system 12 that may include one or more exhaust aftertreatment devices, for example, a three-way catalyst, SCR device, particulate filter, $NO_x$ trap, and other suitable devices.

Ambient air enters an air supply system for the engine 2 via an air inlet 9, is compressed by the compressor 8C and is supplied to an air inlet component such as an inlet manifold 7 via a conduit 9C.

Exhaust gas is recirculated from the engine outlet passage 3 to the inlet manifold 7 via an exhaust gas recirculation system. The exhaust recirculation system comprises an exhaust gas cooler 5, an exhaust gas recirculation valve 6 an exhaust gas recirculation flow path and an electronic controller 20. The inlet manifold 7 may include a throttle valve (not shown) or a separate throttle body may be provided.

The exhaust gas recirculation flow path comprises a first conduit 4A arranged to extract exhaust gas from, in the case of this example, the engine outlet passage 3 at a position upstream of the turbine 8T and supply it to the exhaust gas cooler 5, a second conduit 4B arranged to transfer cooled exhaust gas from the exhaust gas cooler 5 to an inlet of the exhaust gas recirculation valve 6 and a third conduit 4C arranged to transfer exhaust gas from an outlet of the exhaust gas recirculation valve 6 to the inlet manifold 7.

A human machine interface (HMI) in the form of an ignition switch 10 is provide to enable the engine 2 to be started and shut-down by an operator of the motor vehicle 1. It will be appreciated that various arrangements can be used to switch on and off the engine and that the invention is not limited to the use of an ignition switch. When the HMI 10 is operated so as to start the engine 2 and place it into a running state this is known as a 'key-on' event and when the HMI 10 is operated so as to shut-down the engine 2 and place it into a non-running or stopped state this is known as a 'key-off' event.

A key-on event may include a vehicle operator actuating a key to an on position to initiate engine operation (e.g., engine begins spinning and cylinders begin firing). Additionally or alternatively, a vehicle may include a keyless, push-to-start interface (e.g., the vehicle operator may push a button). Thus, the key-off event may include the vehicle operator turning a key to an off position or depressing a button to an off position. It will be further appreciated that a key-on and/or key-off event may occur without input from the vehicle operator. In one example, a key-off in a hybrid vehicle may include deactivating an engine such that the engine is no longer spinning and its cylinders are not firing, while the vehicle remains active and mobile via a hybrid vehicle EV mode (e.g., vehicle propels via a battery or other electric energy source). In other examples, key-off may include both the engine and vehicle being shutdown such that the cylinders of the engine are not firing and the vehicle is not moving (e.g., stationary).

When a key-on event occurs, the electronic controller 20 is activated or placed into an active state and, when a key-off event occurs, the electronic controller 20 is placed into a sleep or snooze state to reduce the consumption of electricity from a battery 30 while the engine 2 is not running. In the sleep state most of the functionality of the electronic controller 20 is switched off with only the essential functionality desired during the sleep state being left active.

A temperature sensor 21 is shown coupled to the exhaust gas recirculation valve 6 for sensing the temperature of the exhaust gas recirculation valve 6. It will be appreciated that the invention is not limited to the use of a temperature sensor and that for some embodiments the temperature sensor may not be included. It will also be appreciated that alternative measurements of temperature could be used such as, for example and without limitation, ambient temperature sensing, engine temperature, engine load, exhaust gas temperature, air/fuel ratio, and other suitable measurements. Additionally or alternatively, a location of the temperature sensor 21 may be altered without departing from the scope of the present disclosure.

FIGS. 2A and 2B show the same exterior cross-sectional view of the exhaust gas recirculation valve 6. As such, components previously introduced may be similarly numbered in subsequent figures. Specifically, FIG. 2A shows the exhaust gas recirculation valve 6 in a closed position and FIG. 2B shows the exhaust gas recirculation valve in an open position. FIGS. 2A and 2B may therefore be described together in the description herein.

The exhaust gas recirculation valve 6 comprises an electric actuator such as a solenoid 13 mounted on a valve body 14 and a valve 6V moveable by the solenoid 13.

The valve body 14 defines a valve chamber having an inlet connected to the second conduit 4B and an outlet connected to the third conduit 4C. The flow of exhaust gas through the valve body 14 is controlled by the valve 6V. The valve 6V comprises of a valve stem 15 and a valve member 16 mounted at an end of the valve stem 15 opposite the solenoid 13. The valve member 16 is engageable with an outlet port 19 to control the flow of exhaust gas through the exhaust gas recirculation valve 6 in response to a control signal provide to the solenoid 13 from the electronic controller 20. It will be appreciated that the solenoid 13 could be driven via a power supply that is controlled by the electronic controller 20 and as such, the electronic controller 20 may not directly provide the needed electrical power for the solenoid 13.

The valve stem 15 is engaged with the solenoid 13 and is moved axially (parallel to double-headed arrow 100) in response to the application of a magnetic flux provided by the solenoid 13 against the action of a spring (not shown).

When the valve member 16 is moved away from the outlet port 19 exhaust gas can flow through the exhaust gas recirculation valve 6 from the second conduit 4B to the third conduit 4C. When the valve member 16 is fully engaged with the outlet port 19 no exhaust gas can flow through the exhaust gas recirculation valve 6 from the second conduit 4B to the third conduit 4C. The displacement of the valve member 16 relative to the outlet port 19 is therefore used to control the amount of exhaust gas recirculation flow from the outlet passage 3 to an inlet manifold (e.g., the inlet manifold 7 shown in FIG. 1). As such, the valve member 16 may be moveable to a position between being fully engaged with the outlet port 19 (as shown in FIG. 2A) and being moved at least partly away from the outlet port 19 (as shown in FIG. 2B).

A guide 17 may support axial movement of the valve stem 15 but also to act as a scraper as will be described in more detail hereinafter.

The temperature sensor 21 is shown in FIGS. 2A and 2B for sensing the temperature of the exhaust gas recirculation valve 6 and, in particular, the temperature in the region of the valve member 16 and valve stem 15. The sensor 21 may further be used for sensing of the temperature of the valve body 14 or direct sensing of the temperature of the valve stem 15 and that temperature modelling (e.g., estimating) could be used to predict the temperature of a component.

Turning now to FIG. 2A, the valve member 16 is shown in a fully closed position and deposits 18 of combustion are shown on the valve stem 15 and bridging between the valve member 16 and the valve body 14. Such deposits may result in malfunction of the exhaust gas recirculation valve 6 if not removed because they act so as to stick the valve member 16 in the fully closed position or prevent free movement of the valve stem 15 if they remain in place when the exhaust gas recirculation valve 6 cools. This may lead an engine controller to determine the exhaust gas recirculation valve 6 as degraded when it is not.

FIG. 2B shows the valve body member 16 being actuated during a cleaning operation. Thus, the valve stem 15 and the valve member 16 may be equal to a temperature where any deposits 18 are still soft enough to be easily removed. The valve member 16 has been moved as part of a delayed cleaning operation or cycle into a partially open position thereby breaking the bond between deposits 18 and portions of the valve stem 15 and valve member 16 located below the guide 17. The guide 17 acts in this case as a scraper to remove the deposits 18 that have built up on the valve stem 15 that would otherwise restrict motion of the valve stem 15 during normal use thereby resulting in a malfunction of the exhaust gas recirculation valve 6. As such, the guide 17 is circular and surrounds an entire circumference of the valve stem 15, in one example. In some examples, the guide 17 may be in sealing contact with the valve stem 15 such that exhaust gas may not flow between the valve stem 15 and the guide 17. Furthermore, the valve stem 15 is slideable through an opening of the guide 17 along a central axis 105 of the exhaust recirculation valve 6.

When a key-off event occurs, the electronic controller 20 may be placed into a sleep mode to reduce the consumption of electricity by the electronic controller 20. Then after a period of time has elapsed (e.g., a delay), the electronic controller 20 is activated (e.g., woken) and an exhaust gas valve cleaning cycle may be executed by the electronic controller 20. In some examples of a key-off event, the electronic controller 20 may remain active if the engine is deactivated and the vehicle is not (e.g., a hybrid vehicle operating in electric vehicle mode while its engine is not firing). One example may include vehicles comprising a start/stop mechanism. Thus, in some examples, a key-off event may include only an engine shut-down while in other examples, the key-off event may include both an engine and a vehicle shut-off.

The cleaning cycle comprises of at least one operation of the exhaust gas recirculation valve 6. That is to say, the solenoid 13 is operated by the electronic controller 20 to open and close the exhaust gas recirculation valve 6 at least once to remove combustion deposits from the valve stem 15 and the valve member 16 by causing the valve stem 15 to reciprocate axially as indicated by the double headed arrow d. In some examples, the cleaning cycle comprises a plurality of operations of the exhaust gas recirculation valve 6.

The period of time chosen to delay cleaning from a key-off event may be based on one or more of deposits still being soft enough to be removed easily and cooling of the exhaust gas recirculation valve 6 is such that the likelihood of deposits reforming on the valve stem 15 or re-bonding to the valve member 16 or to the valve body 14 is considerably reduced. It will be appreciated that as the deposits cool they tend to harden and are then more difficult to remove and that at ambient temperature a large force is applied by the solenoid 13 to remove the deposits. This is particularly the case if the effect of these deposits is to bond the valve member 16 to the valve body 14. The application of such a large force will place a strain on the electrical components due to the high current needed and, in severe cases of deposit accumulation, the force needed could be greater than that available from the solenoid 13. Thus, the cleaning may occur within a threshold temperature range, wherein a temperature above this range is too hot and particulates have an increased likelihood of rebinding to the valve body 14, and where a temperature below the range is too cold and particulates are too hard such that they are difficult to remove. In this way, the threshold temperature range is based on a temperature range for cleaning the exhaust gas recirculation valve 6 fewer cleaning cycles and less energy compared to cleaning outside the threshold temperature range The period of time may be a predefined time delay from the time that the key-off event occurs. As such, a timer (not shown) is started when the key-off event occurs and, when the timer elapses (e.g., 20 seconds), the electronic controller 20 is activated and the cleaning cycle takes place. It will be appreciated that the timer could count up from or count down to zero.

Alternatively, the period of time could be based upon the temperature of a component of the exhaust gas recirculation valve 6 or other temperatures that provides an indication of the predicted state of the deposits (e.g., temperature of the outlet port 19). That is to say, the component provides an indication when the deposits will be easy to remove and are not likely to reform. Thus, the temperature sensor 21 may provide a measurement of temperature and the measured temperature is compared with a threshold temperature. When the temperature is sensed by the temperature sensor 21 to be at or below the threshold temperature, the electronic controller 20 is activated and the cleaning cycle takes place. Alternatively, the temperature of a component could be modelled and the modelled temperature be used for comparison with the threshold temperature. Additionally or alternatively, a temperature of exhaust gas in the third conduit 4C may be used to estimate a temperature of or within the valve body 14. Further examples of determining the duration of the delay are described below.

At any rate, after the cleaning cycle has taken place, the electronic controller 20 is placed into a sleep mode to reduce the consumption of electricity by the electronic controller 20.

It some embodiments more than one cleaning cycle is conducted and in such an embodiment there is a period of time allowed to elapse between each cleaning cycle in which the electronic controller 20 is placed into the sleep mode. In some examples, the delay between cleaning cycles may be substantially equal to the delay following a key-off event.

In further embodiments cleaning of the exhaust gas recirculation valve 6 may be restricted or prevented if the state of charge of the battery (e.g., battery 30 shown in FIG. 1) is below a threshold charge. Thus, the threshold charge may be based on a state of charge of a battery capable of performing at least one cleaning cycle. Thus, if the state of charge of the battery is less than the threshold charge, enough power may not be available to perform the cleaning.

Thus, by delaying cleaning of the exhaust gas recirculation valve until a period of time has elapsed and where the deposits are still soft enough to be easily removed, deposits are less likely to reform after cleaning of the valve, and the risk of malfunctioning of the exhaust gas recirculation valve is considerably reduced compared to a cleaning method where the cleaning occurs immediately after the engine is switched off when the deposits are still hot and likely to reform on the valve stem and valve member after cleaning, energy used during the cleaning is substantially decreased and a likelihood of degradation of the valve is decreased.

It will however be appreciated that cleaning of the exhaust gas recirculation valve immediately upon receipt of a key-off event may be used in combination with the delayed cleaning method described above.

In this way, FIGS. 1, 2A, and 2B show an exhaust gas recirculation valve comprising a moveable valve stem slideably located interior to a guide configured to scrape deposits off of the valve stem with a controller with computer readable instructions stored thereon for cleaning the exhaust gas recirculation valve following a delay subsequent an engine shut-down at least once based on one or more of a state of charge of a battery and a temperature of the exhaust gas recirculation valve. The cleaning may occur if the state of charge of the battery is greater than a threshold state of charge, where the threshold state of charge is based on a state of charge capable of performing at least one cleaning operation, and where the controller is deactivated outside of the cleaning operation to preserve the state of charge of the battery. Additionally or alternatively, the cleaning may occur if the temperature of the exhaust gas recirculation valve is within a threshold range, where the threshold range is less than an operating temperature of the exhaust gas recirculation valve and greater than an ambient temperature. The delay may be based on a temperature decrease of the exhaust gas recirculation valve following the engine shut-down. In one example, an activation of the engine either disables the cleaning of the valve or terminates the delay.

FIGS. 3A-6 describe different embodiments of a method, where the method comprises deactivating a controller used to operate an exhaust gas recirculation valve, delaying a cleaning of the exhaust gas recirculation valve, and reactivating the controller to clean the exhaust gas recirculation valve in response to the delaying being complete following a shut-down of an engine. Cleaning the exhaust gas recirculation valve may include oscillating a moveable portion of the exhaust gas recirculation valve from a closed position to an open position. The cleaning of the exhaust gas recirculation valve may further include scraping deposits off a stem of the exhaust gas recirculation valve via a guide as the exhaust gas recirculation valve is actuated. The cleaning of the exhaust gas recirculation valve includes two or more cleaning operations to clean the exhaust gas recirculation valve, and where the controller used to actuate the exhaust gas recirculation valve is deactivated following a cleaning cycle. The two or more cleaning operations further comprise a delay between subsequent cleaning operations. Activation of the engine in response to a key-on event includes terminating either a delay or the cleaning of the exhaust gas recirculation valve and activating the controller.

With reference to FIG. 3A, it shows a method 300 of cleaning an exhaust gas recirculation valve such as the exhaust gas recirculation valve 6 in the embodiment of FIG. 1. Instructions for carrying out method 300 and the rest of the methods included herein may be executed by a controller (e.g., controller 20) based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 300 begins at 302, where the method 300 includes determining, estimating, and/or measuring current engine operating parameters. The current engine operating parameters may include but are not limited to one or more of engine speed, engine temperature, exhaust gas temperature, battery state of charge, EGR flow rate, manifold vacuum, and air/fuel ratio.

At 304, the method 300 includes measuring a temperature of an exhaust gas recirculation valve based on feedback from a temperature sensor coupled thereto. In some examples, the temperature of the exhaust gas recirculation valve is estimated based on one or more of a temperature of exhaust gas flowing into the valve, a temperature of exhaust gas flowing out of the valve, and an engine temperature. It will be appreciated that in some embodiments of the method, the exhaust gas recirculation valve temperature may not be measured while still proceeding with the method.

At 306, the method 300 includes determining if a key-off event has occurred. In one example, the key-off includes a vehicle operator deactivating an engine via a key. In another example, the vehicle operator may depress a button to deactivate the engine. In some examples, the key-off may include shutting down both the engine and the vehicle (i.e. a vehicle-off) such that the vehicle is unable to move via its own accord (e.g., no mechanical or electrical power). In other examples, the key-off may include shutting down only the engine such that the vehicle may still move via a battery or other energy source outside of the engine. If a key-off event has not occurred, then the method 300 proceeds to 308 to maintain current engine operating parameters and does not shut-off the controller and/or perform a valve cleaning operation due to cylinders of the engine firing and the engine still spinning. If a key-off event has occurred, the method 300 proceeds to 310 to actuate an electronic controller used to control operation of the exhaust gas recirculation valve to a sleep mode (e.g., the electronic controller for the exhaust gas recirculation valve is deactivated).

At 312, the method 300 includes allowing a period of time to pass (e.g., a delay) following the key-off event. The delay may allow the exhaust gas valve and, in particular, a moveable valve of the exhaust gas recirculation valve to cool from its normal working temperature to a temperature where deposits on the valve are still sufficiently soft to allow them to be easily removed while also being unlikely to reform on the valve after cleaning has taken place. Thus, in some examples, the temperature may be a temperature range where the deposits are sufficiently soft and unlikely to reform on the valve. In one example, the delay may be based on a rate of temperature decrease of the exhaust gas recirculation valve where the rate is based on the engine temperature at the key-off, where the delay is increased as the engine temperature increases. The rate may be further based on an ambient temperature, where a lower ambient temperature increases the rate. Alternatively or additionally, the delay may be a set delay, where the delay is a fixed amount of time (e.g., 10 seconds) following the key-off independent of an engine temperature prior to key-off. It will be appreciated that the delay may be based on other conditions while still providing sufficient time for the exhaust gas recirculation valve to reach the temperature range.

In some examples, the delay may be dependent on one or more of when a previous exhaust gas recirculation valve cleaning occurred, time elapsed since exhaust gas recirculation was previously used, and an ambient temperature. If the exhaust gas recirculation valve has not been cleaned for a threshold distance (e.g., 100 miles) or threshold period of time (e.g., 10 hours of vehicle operation with the engine firing), then the delay may be truncated. Likewise, as a period of time and/or distance travelled increases between when exhaust gas recirculation was last used and key-off, the delay may correspondingly decrease. Furthermore, the delay following the key-off may decrease as the ambient temperature decreases (e.g., the exhaust gas recirculation valve cools to the desired temperature range more quickly as the ambient temperature decreases).

At 314, the method 300 includes determining if a battery state of charge is greater than the threshold charge. As described above, the threshold charge is based on a minimum charge capable of cleaning the valve for at least a single cleaning operation. In some examples, the minimum charge may be based on an amount of deposits accumulated onto the exhaust gas recirculation valve. Thus, as the amount of deposits increases, the minimum charge needed to clean the valve may also increase. In other examples, the minimum charge may be fixed. If the battery state of charge is less than the minimum charge, then the method 300 proceeds to 316 to maintain current engine operating parameters and does not reactivate the electronic controller to clean the valve. However, if the battery state of charge is greater than the threshold charge, then the method 300 may proceed. In one example, the state of charge of the battery is measured during the delay. In another example, the state of charge is measured before or after the delay. In some embodiments, the determining the state of charge of the battery may be omitted.

As an example, where the vehicle is a hybrid vehicle and key-off includes deactivating the engine while still propelling the vehicle with an electric energy source (e.g., the battery in an electric vehicle (EV) mode), the threshold charge may be increased to account for driving the vehicle and cleaning the exhaust gas recirculation valve. As such, if the battery state of charge is less than the threshold charge, then power may be diverted to meet a driver demand while the valve cleaning does not occur. In other examples, the threshold charge may decrease when the hybrid vehicle is in the EV mode.

Following completion of the delay, the method 300 proceeds to 318 to perform at least one cleaning operation on the valve to remove at least some deposits. The number of cleaning operation cycles performed may be based on one or more of the battery state of charge and an estimated amount of deposits on the valve. As an example, the estimated amount of deposits on the valve may be based on a number of miles driven since a previous valve cleaning operation event. The number of cleaning operation cycles may increase as one or more of the estimated amount of deposits increases or the battery state of charge increases. The cleaning operation cycle may comprise at least one opening and closing of the valve of the exhaust gas recirculation valve so as to break any bonds between a valve member of the valve and a valve body and scrape off any deposits on a valve stem of the valve. In one example, exactly three open and close cycles are used in the cleaning operation cycle. Thus, the cleaning operation cycle may be a fixed amount of cleaning cycles independent of the amount of deposits on the valve. In some examples, cleaning the exhaust gas recirculation valve includes oscillating the valve of the exhaust gas recirculation valve from a closed position to an open position.

At 320, the method 300 includes deactivating the controller back to the sleeping mode following completion of the cleaning operation cycles. By doing this, the state of charge of the battery may be preserved.

At 322, the method 300 includes determining if a key-on event has occurred (e.g., engine start demand). If the key-on event has not occurred, then the method 300 proceeds to 324 to maintain current engine operating parameters and the controller remains disabled. The method 300 continues monitoring for a key-on event. If the key-on event has occurred, then the method proceeds to 326 to activate the controller and then start the engine at 328.

FIG. 3B includes a first optional sub-routine 325 of the method 300 for implementing the delay described at 312 of the method 300. Thus, conditions prior to implementing the sub-routine 325 include the key-off event occurring and the electronic controller being disabled.

At 330, the sub-routine 325 includes starting the timer once the delay is initiated following the key-off event. At 332, the timer is running, where the timer tracks an amount of time that has passed since the key-off event. The timer may count incrementally up from 0 to a desired delay or incrementally down from the desired delay to 0. As described above, the desired delay may be fixed or based on one or more engine conditions at the key-off event.

At 334, the sub-routine 325 includes determining if a key-on event has occurred (similar to 332 of method 300). If the key-on event has occurred, then the sub-routine 325 proceeds to 326 of method 300. If the key-on event has not occurred, then the sub-routine 325 proceeds to 336 to determine if a current elapsed time (t) indicated by the timer is greater than or equal to the desired delay (e.g., the delay is complete). Herein, the desired delay may also be referred to as a time limit ($t_{limit}$). The time limit ($t_{limit}$) is based on the desired temperature range described above, in one example. In some examples, the time limit ($t_{limit}$) increases as the engine temperature prior to the key-off event increases.

If the current elapsed time (t) is not greater than or equal to the time limit ($t_{Limit}$), then sub-routine 325 proceeds to 338 to maintain current operation and keeps the timer running. The sub-routine 325 may continue monitoring a value of the timer until it reaches the time limit ($t_{limit}$). However if the current elapsed time (t) is greater than or equal to the time limit ($t_{Limit}$), the sub-routine proceeds to 318 of method 300.

It will be appreciated that the time limit ($t_{Limit}$) is set to allow the exhaust gas recirculation valve to cool sufficiently to perform the cleaning operation while any deposits are still soft enough to allow them to be easily removed but is sufficiently cool that deposits are unlikely to reform on the valve.

The time limit ($t_{Limit}$) in some embodiments is a fixed period of time and in other embodiments is adjusted to take into account other factors that affect cooling of the exhaust gas recirculation valve. For example and without limitation, if the ambient temperature is very low the cooling of the exhaust gas recirculation valve is likely to be faster than if the ambient temperature is high and so a relationship between ambient temperature and desired cooling time could be used to adjust the desired time limit ($t_{Limit}$). The relationship between ambient temperature and $t_{Limit}$ could be provided by way of an algorithm or a look up chart or a different suitable manner.

It will be appreciated that the timer may count down from the time limit ($t_{limit}$) to zero, where the sub-routine 325 proceeds to 318 of FIG. 3A in response to the timer reaching zero.

Figure 3C:
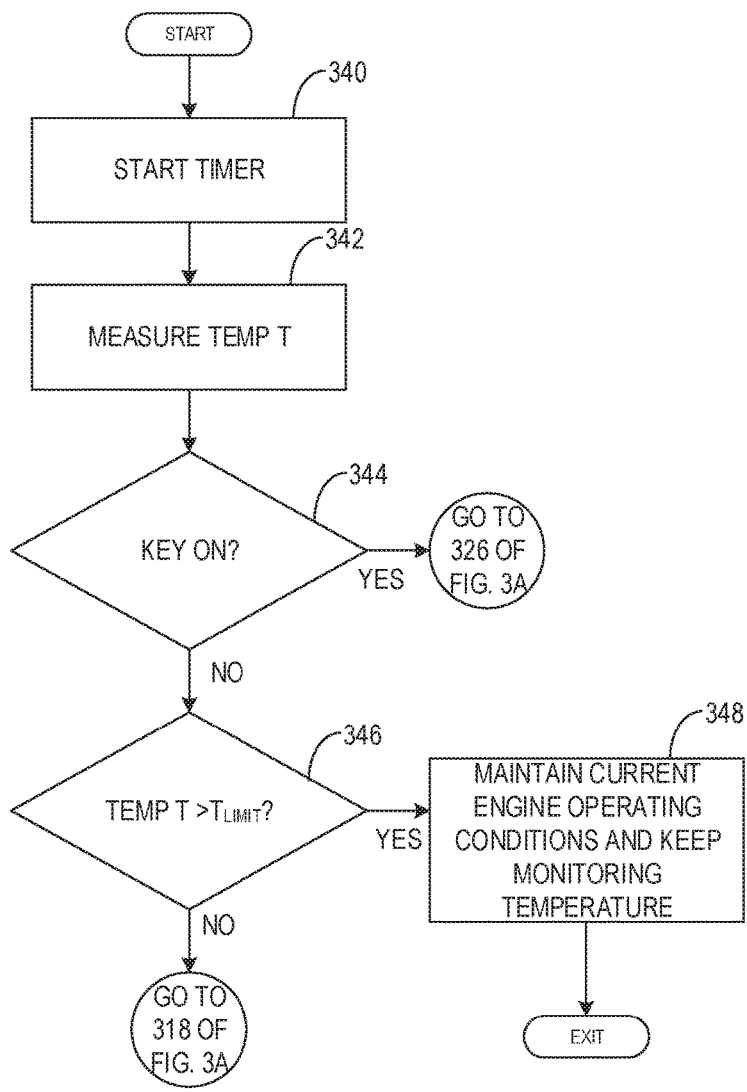
FIG. 3C shows an alternative routine for use in the method of FIG. 3A for delaying the starting of the valve member cleaning operation.
Figure 4:
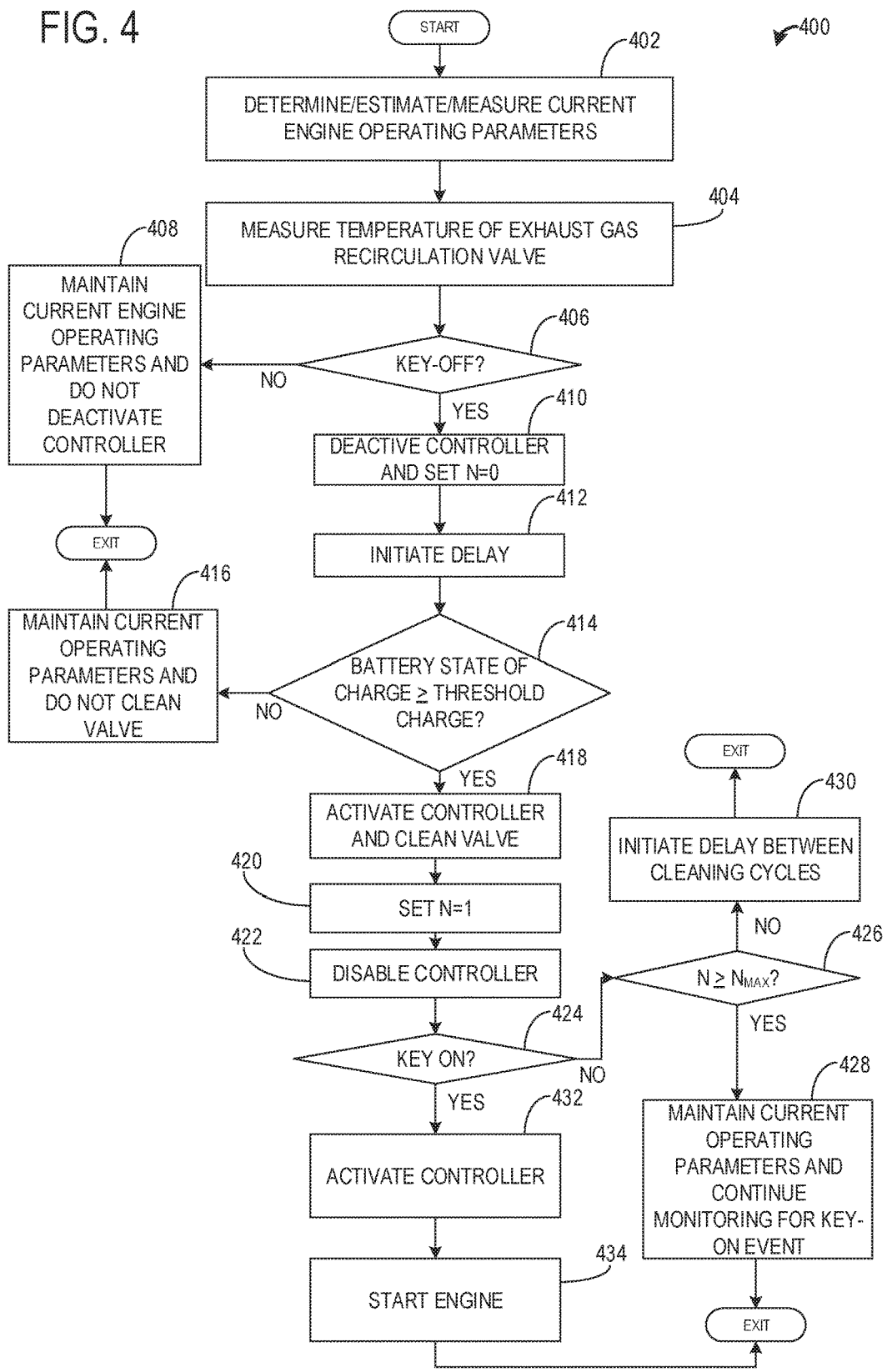
FIG. 4 shows a high level flow chart of a second embodiment of a method of cleaning an exhaust gas recirculation valve having a moveable valve so as to reduce exhaust gas recirculation valve malfunctioning in accordance with the third aspect of the invention.

FIG. 3C shows a second optional sub-routine 350 of the method 300 for implementing the delay described at 312 of the method 300 based on a measured temperature of the exhaust gas recirculation valve. Thus, conditions for the second sub-routine 350 include the key-off event occurring and the electronic controller being disabled.

At 340, the sub-routine 350 includes starting the timer once the delay is initiated following the key-off event. At 342, the sub-routine 350 includes measuring a temperature of the exhaust gas recirculation valve via a temperature sensor. For example, the temperature of the exhaust gas recirculation valve 6 is measured via temperature sensor 21 in the embodiment of FIG. 1. In other examples, the temperature of the exhaust gas recirculation valve may be estimated based on an engine temperature, exhaust gas temperature, and/or other suitable parameters.

At 344, the sub-routine 350 includes determining if a key-on event has occurred (similar to 332 of method 300). If the key-on event has occurred, then the sub-routine 350 proceeds to 326 of method 300. If the key-on event has not occurred, then the sub-routine 350 proceeds to 346 to determine if the currently measured temperature (Temp T) is greater than a predefined temperature limit ($T_{Limit}$). If the current temperature (Temp T) is greater than the temperature limit ($T_{Limit}$), then the sub-routine 350 proceeds to 348 to maintain current operating conditions and continues monitoring the exhaust gas recirculation valve temperature. However, if the current temperature (Temp T) is less than or equal to the temperature limit ($T_{Limit}$), the sub-routine 350 proceeds to 318 of the method 300 to clean the exhaust gas recirculation valve.

In the case of this example the temperature limit $T_{Limit}$ is set such that above the temperature limit $T_{Limit}$ the exhaust gas recirculation valve will have cooled insufficiently to significantly reduce the risk of deposits reforming after cleaning of the exhaust gas recirculation valve. The temperature limit $T_{Limit}$ is however sufficiently high that any deposits can be easily removed and have not hardened to make their removal difficult or demand excessive force from the electrical actuator of the exhaust gas recirculation valve.

Therefore in accordance with this first embodiment a single delayed cleaning cycle is performed when the exhaust gas recirculation valve has cooled sufficiently that the risk of deposits reforming after the cleaning cycle has been performed is considerably reduced but before any deposits have hardened and become difficult to remove.

FIG. 4 shows a method 400 of cleaning an exhaust gas recirculation valve such as the exhaust gas recirculation valve 6 in the embodiment of FIG. 1. As one example, the method 400 may be similar to the method 300, but may further include delays between subsequent cleanings of the exhaust gas recirculation valve during a key-off event.

Method 400 begins at 402, where the method 400 includes determining, estimating, and/or measuring current engine operating parameters. The current engine operating parameters may include but are not limited to one or more of engine speed, engine temperature, exhaust gas temperature, battery state of charge, EGR flow rate, manifold vacuum, and air/fuel ratio.

At 404, the method 400 includes measuring a temperature of an exhaust gas recirculation valve based on feedback from a temperature sensor coupled thereto. In some examples, the temperature of the exhaust gas recirculation valve is estimated based on one or more of a temperature of exhaust gas flowing into the valve, a temperature of exhaust gas flowing out of the valve, and an engine temperature.

At 406, the method 400 includes determining if a key-off event has occurred. If a key-off event has not occurred, then the method 400 proceeds to 408 to maintain current engine operating parameters and does not shut-off the controller and/or perform a valve cleaning operation. If a key-off event has occurred, the method 400 proceeds to 410 to actuate an electronic controller used to control operation of the exhaust gas recirculation valve to a sleep mode (e.g., the electronic controller for the exhaust gas recirculation valve is disabled). Furthermore, a counter is set to zero (N=0). The counter may measure a number of delays conducted during the key-off sequence, in one example.

At 412, the method 400 includes initiating a period of time to pass (delay), similar to 312 of method 300. At 414, the method 400 includes determining if a state of charge of the battery is greater than a threshold charge, similar to 314 of method 300. If the charge is not greater than the threshold charge, then the method 400 proceeds to 416 to maintain current operating parameters and does not clean the valve, similar to 316 of method 300. If the charge is greater than the threshold charge, then the method 400 proceeds to 418 to clean the valve at least once by reactivating the controller, similar to 318 of method 300. At 420, the method 400 includes incrementing the value of the counter by one (N=1). As such, the counter is counting a number of cleaning cycles completed.

At 422, the method includes deactivating the controller, similar to 320 of method 300. At 424, the method 400 includes determining if a key-on event has occurred. If a key-on event has not occurred, then the method 400 proceeds to 426 to determine if the value of counter (N) is greater than or equal to a predefined value ($N_{max}$). For example, if two cleaning cycles are to be performed then $N_{Max}$ is set to 2 so that after two cleaning cycles have been carried out no further cleaning will occur and the method 400 will continue to operate the key-off event without additional cleaning cycles.

If the value of the counter is greater than or equal to the predefined value $N_{Max}$, then the method 400 proceeds to 428 maintain current operating conditions and monitor conditions for a key-on event. However, if the value of the counter is less than the predefined value $N_{Max}$, the method 400 proceeds to 430 to set a delay between cleaning cycles.

It will be appreciated that the delay set for the first cleaning cycle (at 412) could be set to a different value to that used between the first and the second cleaning cycles. That is to say, the delay used at 412 may be different than the delay used the second or subsequent time at 430. As before, the delay may be a time delay based upon a counting of elapsed time or be based upon a measurement or estimate of the temperature of the exhaust gas recirculation valve.

Returning to 424, if the key-on event has occurred, then the method 400 proceeds to 432 to activate the controller subsequently followed by starting the engine at 434, similar to 326 and 328 of method 300, respectively.

Turning now to FIG. 5, it shows a method 500, which is similar to method 400. Specifically, 502, 504, 506, 508, 510, 512, 514, 516, 518, 520, 522, 524, 526, 528, 532, 534, and 536 of method 500 are substantially similar to 402, 404, 406, 408, 410, 412, 414, 416, 418, 420, 422, 424, 426, 428, 430, 432, and 434 of method 400, respectively. A difference between the methods is that method 500 further includes determining whether the state of charge of a battery such as battery 40 in the embodiment of FIG. 1 is greater than or equal to a predefined limit ($SOC_{Min}$) if further cleaning cycles are desired (e.g., if the value of the counter is less than the predefined value ($N_{Max}$). If the current state of charge (SOC) is higher than the state of charge limit ($SOC_{Min}$) at 530, then method 500 proceeds to 532 to provide a delay between cleaning operations cycles. If the current state of charge (SOC) is not higher than the state of charge limit ($SOC_{Min}$), the method 500 proceeds to 528 to maintain current operating parameters and continues to monitor if a key-on event occurs This checking of battery state of charge is particularly relevant if more than one cleaning cycle is to be performed because it is important that sufficient charge remains in the battery to restart the engine and operate the main electrical and electronic systems of the motor vehicle when the engine is restarted.

Turning now to FIG. 6, it shows a method 600, which is similar to method 300 of FIG. 3A. Specifically, 602, 604, 606, 608, 612, 614, 616, 618, 620, 622, 624, 626, 628, and 630 of method 600 are identical to 302, 304, 306, 308, 310, 312, 314, 316, 318, 320, 322, 324, and 326 of method 300, respectively. However, method 600 differs from method 300 in that the method 600 further includes performing a valve cleaning at 610 prior to deactivating the controller and initiating the delay following the key-off. Thus, the cleaning of the valve is carried out immediately following the key-off event without a delay while the exhaust gas recirculation valve is still at substantially its normal working temperature. This cleaning step may removes some of the accumulated deposits before deactivating the controller and delaying subsequent cleaning operation cycles. By doing this, a number of cleaning cycles may be decreased. As an example, method 600 may be implemented instead of method 300 if opportunities for cleaning the exhaust gas recirculation valve do not arise very often or if previous cleanings of the exhaust gas recirculation valve were unable to meet the predefined value $N_{Max}$. This may be due to key-on events interrupting exhaust gas recirculation valve cleaning, the battery state of charge not being great enough to perform the predefined value $N_{Max}$ number of cleanings, and/or if an ambient temperature is below a lower threshold ambient temperature (e.g., 32° C.) such that a duration the exhaust gas recirculation valve temperature is within the desired temperature range is relatively short. Thus, performing a valve cleaning directly after the key-off without a delay may at least provide some cleaning during conditions where complete cleaning of the exhaust gas recirculation valve is difficult and/or unlikely.

It will be appreciated that the methods and routines described above may be terminated in response to a key-on event. In this way, the exhaust gas recirculation valve may no longer be actuated in response to a cleaning cycle, but in response to an exhaust gas recirculation demand of the engine.

In this way, an exhaust gas recirculation valve may be cleaned of deposits deposited by exhaust gas diverted from an exhaust passage to an intake passage. The deposits are removed following a key-off (e.g., engine shutdown) by actuating the valve from open to close positions in a desired temperature based on a softness of the deposits and a likelihood of the deposits re-binding with the valve. The technical effect of cleaning the valve is to prevent degradation of the valve and/or to prevent a determination of degradation of the valve. By delaying a cleaning of the valve following the key-off event, the temperature of the valve may reach the desired temperature and increase an efficiency of the cleaning operation. Furthermore, a controller used to actuate the valve is disabled between cleaning operation cycles to preserve a state of charge of a battery. This may further improve a vehicle fuel efficiency.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing may be altered to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

Although the invention has been described with reference to a pintle type exhaust gas recirculation valve it will be appreciated that it could be applied to other types of exhaust gas recirculation valve with advantage. Although the invention has been described by way of example to a turbocharged diesel engine for which its use is particularly advantageous it will be appreciated that it could be applied with benefit to other types of engine where malfunctioning of the exhaust gas recirculation valve due to accumulated deposits is a problem.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust gas recirculation system for an engine of a motor vehicle comprising:
an exhaust gas recirculation passage connecting an exhaust gas outlet from the engine to an air inlet of the engine, an exhaust gas recirculation valve for controlling a flow of exhaust gas through the exhaust gas recirculation passage and an electronic controller to control opening and closing of the exhaust gas recirculation valve during engine operation and to control the exhaust gas recirculation valve to perform at least one valve cleaning operation to remove deposits from the exhaust gas recirculation valve when the engine is deactivated, wherein the electronic controller is further operable to delay execution of the at least one valve cleaning operation following a shutdown of the engine to allow cooling of the exhaust gas recirculation valve to take place thereby reducing a likelihood that deposits will reform on the exhaust gas recirculation valve after the valve cleaning operation has taken place, wherein the delay is between the shutdown of the engine and a start of the valve cleaning operation and is based upon a comparison of a measured temperature with a temperature limit, wherein the delay is adjusted based on an ambient temperature.

2. The exhaust gas recirculation system of claim 1, wherein the electronic controller is operable to enter a sleep mode during the delay between the shutdown of the engine and the start of the valve cleaning operation.

3. The exhaust gas recirculation system of claim 1, wherein the electronic controller measures a duration of time of the delay between the shutdown of the engine and the start of the valve cleaning operation.

4. The exhaust gas recirculation system of claim 3, wherein the delay is based upon a comparison of the duration of time with a predefined time limit.

5. The exhaust gas recirculation system of claim 1, wherein the exhaust gas recirculation valve comprises a temperature sensor arranged to provide a measurement of temperature to the electronic controller indicative of a temperature of the exhaust gas recirculation valve.

6. The exhaust gas recirculation system of claim 1, wherein the electronic controller further includes a model of predicted relationship between temperature and time for the exhaust gas recirculation valve, and where the delay between the shutdown of the engine and the start of the valve cleaning operation is based upon a comparison of a predicted temperature of the exhaust gas recirculation valve with a predefined temperature limit.

7. The exhaust gas recirculation system of claim 6, wherein the predicted temperature of the exhaust gas recirculation valve is based on an engine temperature, exhaust gas recirculation temperature, engine load, and air/fuel ratio.

8. The exhaust gas recirculation system of claim 1, wherein the valve cleaning operation includes two or more cleaning operations and the electronic controller is operable to enter a sleep mode during a first delay between the shutdown of the engine and commencement of a first one of the valve cleaning operations and is further operable to enter the sleep mode during respective delay periods between subsequent cleaning operations.

9. The exhaust gas recirculation system of claim 1, wherein the electronic controller is coupled to at least one battery, and where the cleaning of the exhaust gas recirculation valve is based on a state of charge of a battery being greater than or equal to a predefined state of charge limit.

10. A method comprising:
following a shut-down of an engine:
deactivating a controller used to operate an exhaust gas recirculation valve;
delaying a cleaning of the exhaust gas recirculation valve; and
reactivating the controller to clean the exhaust gas recirculation valve in response to the delaying being complete, wherein the delay is variable based upon an ambient temperature, and where the delay is complete in response to an exhaust gas recirculation valve temperature being less than or equal to a temperature limit.

11. The method of claim 10, wherein cleaning the exhaust gas recirculation valve includes oscillating a moveable portion of the exhaust gas recirculation valve from a closed position to an open position, and wherein the delaying occurs while the engine remains shut-down, wherein the delaying being complete includes a delay timer reaching a delay timer threshold, the delay timer commencing at the shut-down and increasing during the shut-down and reaching the threshold during the shut-down where the engine has remained shut-down throughout the delay, and wherein the delay timer threshold is determined by the controller before deactivation.

12. The method of claim 10, wherein the cleaning of the exhaust gas recirculation valve further includes scraping deposits off a stem of the exhaust gas recirculation valve via a guide as the exhaust gas recirculation valve is actuated.

13. The method of claim 10, wherein the cleaning of the exhaust gas recirculation valve includes two or more cleaning operations to clean the exhaust gas recirculation valve, and where the controller used to actuate the exhaust gas recirculation valve is deactivated following a cleaning cycle.

14. The method of claim 13, wherein the two or more cleaning operations further comprise a delay between subsequent cleaning operations.

15. The method of claim 10, wherein the shut-down of the engine includes not firing engine cylinders and not spinning the engine.

16. A system comprising:
an exhaust gas recirculation valve comprising a moveable valve stem slideably located interior to a guide configured to scrape deposits off of the valve stem; and
a controller with computer readable instructions stored thereon for:
cleaning the exhaust gas recirculation valve following a delay subsequent to an engine shut-down at least once based on one or more of a state of charge of a battery and a temperature of the exhaust gas recirculation valve, wherein the delay is adjusted based on an ambient temperature.

17. The system of claim 16, wherein the cleaning occurs if the state of charge of the battery is greater than a threshold state of charge, where the threshold state of charge is based on a state of charge capable of performing at least one cleaning operation, and where the controller is deactivated outside of the cleaning operation to preserve the state of charge of the battery.

18. The system of claim 16, wherein the cleaning occurs if a temperature of the exhaust gas recirculation valve is within a threshold range, where the threshold range is less than an operating temperature of the exhaust gas recirculation valve and greater than the ambient temperature.

19. The system of claim 16, wherein the delay is based on a temperature decrease of the exhaust gas recirculation valve following the engine shut-down to a desired temperature range, and where a rate of the temperature decrease is based on one or more of an ambient temperature, time elapsed since exhaust gas recirculation was previously used, engine load, and engine temperature prior to engine shut-down.

20. The system of claim 16, further comprising a key-off event prior to the engine shut-down, where a first condition of the key-off event includes shutting down the engine and a vehicle, and where a second condition of the key-off event includes shutting down the engine and operating the vehicle with a secondary power source.

* * * * *